H. S. SMITH.
FASTENINGS FOR RUBBER TIRES.
No. 181,602. Patented Aug. 29. 1876.
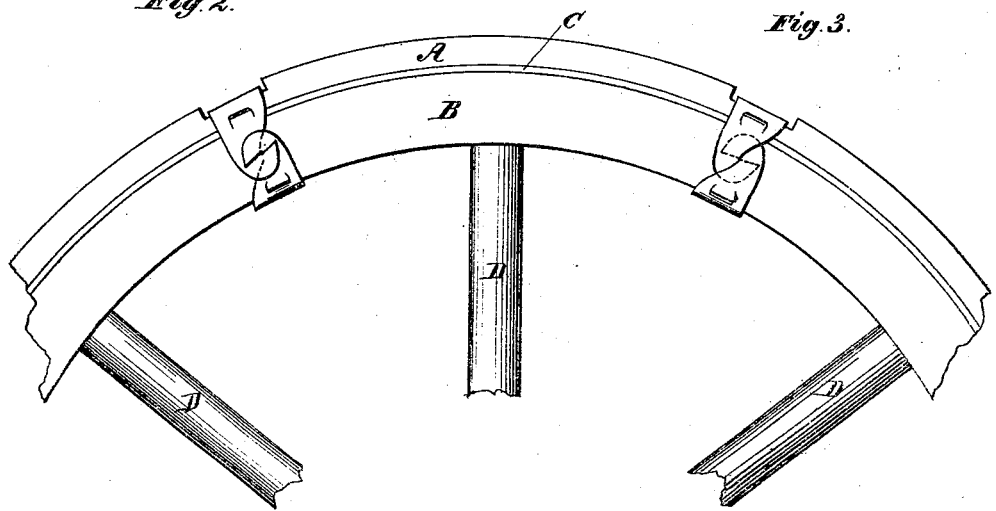

UNITED STATES PATENT OFFICE.

HERBERT S. SMITH, OF NEW YORK, N. Y.

IMPROVEMENT IN FASTENERS FOR RUBBER TIRES.

Specification forming part of Letters Patent No. 181,602, dated August 29, 1876; application filed August 3, 1876.

*To all whom it may concern:*

Be it known that I, HERBERT S. SMITH, of New York, in the county and State of New York, have invented a new and useful Improvement for Fastening Rubber Tires on Wheels; and I do hereby declare that the following is a full and clear description thereof, showing those skilled in the art how to make and use the same, reference being had to the drawings which form part of this specification, like letters referring to like parts.

The object of my invention is to fasten rubber tires on ordinary wheels, principally for use on wheel-chairs for invalids and cripples, in such manner that they may be securely held in their place on the wheel—at the same time present a surface of rubber only to the ground, and without injury to the wheel or rubber tire.

There have been wheels made having a concave tire, or flat tire with side flanges, into which the rubber is sprung; but when the direction of the wheel is changed suddenly while in use the strain on the rubber will spring it out again. Cement will secure rubber to neither wood nor metal for use as a tire on a regular made carriage-wheel, as the twisting or torsion sidewise to which it is necessarily subjected is too great.

Metal tires have been made grooved in various peculiar designs, in and over which the rubber has been molded and vulcanized. This is costly, and in many points defective. Rubber tires have also been bolted to wheels, the bolts passing through the center of the tire and wheel-felly in holes made for the purpose, and screwed until the bolt-heads are below the surface of the rubber; but strain will pull the tire over the bolt-heads, and the holes made weaken both wheel and tire. Riveting is of the same effect.

In the drawings, Figure 1 represents the band of thin narrow metal, and of length sufficient to encompass a required distance, with each end shaped exactly alike, so they may hook onto each other when brought into position, by using a pair of blacksmith's pinchers or other suitable clamp to gripe the raised nibs E E, until the straight edge of each hook is opposite the other, compressing the rubber, when a pair of flat-nose pinchers may be used to press the hook ends together, as shown in Fig. 2 or 3.

The expansibility of the rubber, the straight edge of each hook being at an acute angle, as shown in the drawing, prevents the fastening from becoming loosened sidewise.

In the side view of the section of a wheel shown, A is the rubber tire. B is the felly of the wheel, and D D D spokes; C, the iron tire.

My invention consists of a metal band, as described, used to secure a rubber tire to a wheel, by being bound around the rubber tire and wheel-felly, as shown in Figs. 2 and 3, the rubber tire having cross-depressions on the outer surface to allow the bands to be drawn well below the surface of the rubber. I prefer to use as many bands to a wheel as the wheel has spaces between spokes, putting one in the center of each such space.

The advantages of my improvement are many—first, strength, as no holes are required for its use, while the bands serve to strengthen the wheel; second, smoothness of finish, leaving no projecting corners; third, simplicity and cheapness of manufacture—a single die answers for both ends, each end being stamped separately, and also for any and all different length bands; fourth, no possibility of the rubber tire working off.

I claim as my invention—

A device for securing rubber tires, consisting of a metal band having a hook at each end, said hooks being adapted to interlock with each other, as described.

HERBERT S. SMITH.

Witnesses:
GEORGE T. SIMPSON,
W. W. BEACH.